(12) United States Patent
Najafian

(10) Patent No.: US 11,549,480 B2
(45) Date of Patent: Jan. 10, 2023

(54) FLOATING DRUM TURBINE FOR ELECTRICITY GENERATION

(71) Applicant: Shahriar Najafian, Tehran (IR)

(72) Inventor: Shahriar Najafian, Tehran (IR)

( * ) Notice: Subject to any disclaimer, the term of this patent is extended or adjusted under 35 U.S.C. 154(b) by 83 days.

(21) Appl. No.: 16/483,423

(22) PCT Filed: Feb. 7, 2017

(86) PCT No.: PCT/IB2017/050640
§ 371 (c)(1),
(2) Date: Aug. 4, 2019

(87) PCT Pub. No.: WO2018/146511
PCT Pub. Date: Aug. 16, 2018

(65) Prior Publication Data
US 2020/0011286 A1    Jan. 9, 2020

(51) Int. Cl.
| | | |
|---|---|---|
| *F03B 13/18* | (2006.01) | |
| *B63B 35/44* | (2006.01) | |
| *F03B 17/06* | (2006.01) | |
| *H02K 7/10* | (2006.01) | |
| *H02K 7/18* | (2006.01) | |

(52) U.S. Cl.
CPC ........... *F03B 13/184* (2013.01); *B63B 35/44* (2013.01); *F03B 17/062* (2013.01); *H02K 7/1004* (2013.01); *H02K 7/1823* (2013.01); *B63B 2035/4466* (2013.01); *F05B 2240/13* (2013.01); *F05B 2240/932* (2013.01); *F05B 2260/4021* (2013.01); *Y02E 10/20* (2013.01)

(58) Field of Classification Search
CPC .... F03B 13/184; F03B 17/062; F03B 17/063; B63B 35/44; B63B 2035/4466; H02K 7/1004; H02K 7/1823; F05B 2240/13; F05B 2240/932; F05B 2260/4021; F05B 2240/12; F05B 2260/966; Y02E 10/30; Y02E 10/20
See application file for complete search history.

(56) References Cited

U.S. PATENT DOCUMENTS

| | | | |
|---|---|---|---|
| 2007/0020097 A1 | 1/2007 | Ursua | |
| 2008/0279687 A1* | 11/2008 | Hofmann | ............ F03B 17/065 416/85 |
| 2010/0045046 A1* | 2/2010 | Douglas | ................ F03B 13/16 290/54 |

FOREIGN PATENT DOCUMENTS

CN    203308639 U    11/2013

* cited by examiner

*Primary Examiner* — Michael C Zarroli

(57) ABSTRACT

A floating drum turbine is used for generating the electrical energy from the kinetic energy of a water stream (sea wave or river flow) that provides the mechanical energy needed to rotate an electrical generator for generating the electricity. The drum turbine is installed on a buoyant skid anchored to the seabed by some chains/ropes to keep it in a fixed position and direction along the water stream. The turbine is coupled to an electrical generator with a power transmission system, and generates the electricity that is transferred to the coast using a cable system floated on the water surface.

7 Claims, 3 Drawing Sheets

FLOATING DRUM TURBINE FOR ELECTRICITY GENERATION

BACKGROUND OF THE INVENTION

The field of this invention is about the floating water turbines for generating the electricity using the kinetic energy of a water stream (sea wave or river flow). The known technology of the water turbines includes a floating water turbine having some vanes/blades rotated by a water stream that converts the kinetic energy of the water stream into the electrical energy.

The inventor is aware of the following patents related to the similar water turbines:
- U.S. Pat. No. 672,085 (1901), issued to Tingley,
- U.S. Pat. No. 1,830,985 (1931), issued to Dreier,
- U.S. Pat. No. 4,849,647 (1989), issued to McKenzie,
- U.S. Pat. No. 5,946,909 (1999), issued to Szpur,
- U.S. Pat. No. 0,026,762 (2013), issued to Rajadhyaksha,
- U.S. Pat. No. 0,210,211 (2014), issued to Swamidass, The Tingley's U.S. Pat. No. 672,085, a wave motor capable of responding to the motion of waves and constructed to utilize wave-power in the production of continuous rotary motion.

The Dreier's U.S. Pat. No. 1,830,985, a floating water wheel capable of being turned by the water current, and being capable of operating at various angles in the water. It is possible to join some unit water wheels, where an increase in power is desired.

The McKenzie's U.S. Pat. No. 4,849,647, a floating water turbine for taking the kinetic energy from the linear current flow and converting it into the mechanical energy and subsequently into electrical energy. The turbine is constructed of a buoyant material to support itself on top of the water, thereby eliminating any drag from the apparatus.

The Szpur's U.S. Pat. No. 5,946,909, a series of floating turbine rotors each having a tubular hub with outwardly projecting blades, and the rotors are connected in general axial alignment by a flexible driven shaft. The shaft includes tubular floating connector shafts and flexible couplings, and each rotor is connected to drive the shaft through a one-way ratchet clutch. One or more lines of the connected floating rotors are anchored within the moving water of a river or in the waves flowing into a seashore, and the rotors drive each flexible shaft which drives an electric generator.

The Rajadhyaksha's U.S. Pat. No. 0,026,762, a hydrokinetic water turbine system, including two turbine assemblies each having a frame structure, a horizontally disposed shaft supported by the frame structure, and a rotor secured to the shaft. The rotor has a plurality of spaced-apart blades so that the flowing stream of water revolves the rotor. The two turbine assemblies are secured side by side with shafts coaxial and the rotors rotating in opposite directions. The shafts can drive electric generators located out of the water or under the water.

The Swamidass' s U.S. Pat. No. 0,210,211, the water turbines on the surface of moving water that can capture hydrokinetic energy from waves, currents and other flows. This invention uses a novel system to keep the horizontal-axis water turbines and vertical-axis water turbines operating on the surface of water by mounting them on bridge columns, seawalls, oil rigs, piers and similar structures to capture energy from the moving water next to said structures.

SUMMARY OF THE INVENTION

This invention presents a floating drum turbine for generating the electrical energy from the kinetic energy of a water stream (sea wave or river flow), and transforming the water stream energy into the mechanical energy to rotate an electrical generator for generating the electricity.

The turbine system consists of a drum turbine with longitudinal radial blades supported by two bearing housings on the turbine's shaft ends. The bearing housings are supported by two hollow capsules floated on the water surface that floats the turbine on the water surface. The water stream makes the turbine to rotate, and the generated torque is delivered by a power transmission system (belt and pulleys) to an electrical generator installed over the bearing housing. The turbine is composed of some curved blades surrounded by side plates that are connected to the turbine shaft. The water stream pushes the blades, and makes the turbine shaft to rotate. By the way, the linear force of a water stream is converted into the rotational torque needed for running an electrical generator.

DESCRIPTION OF THE INVENTION

Figure 1:
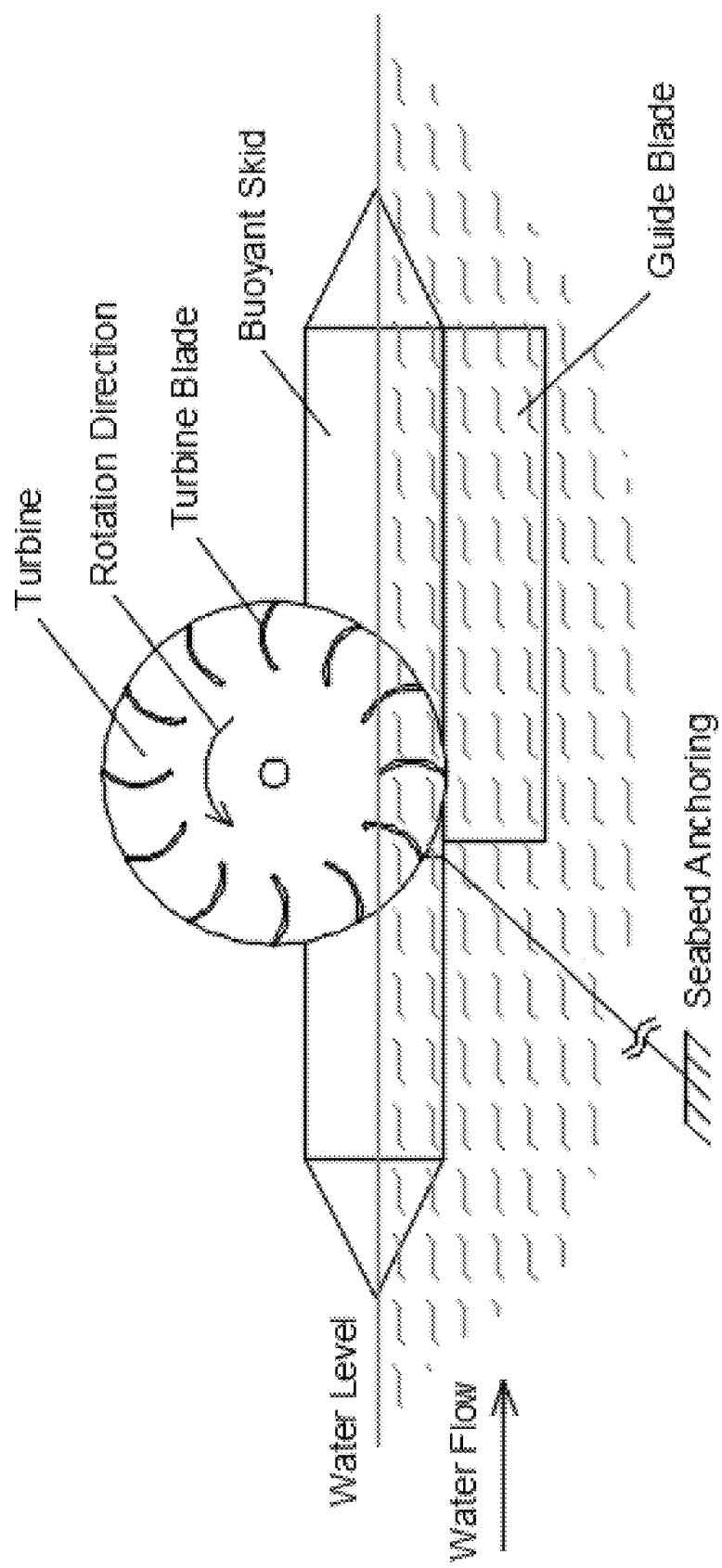
FIG. 1 is an operational drawing of the invented floating drum turbine.

The operation method of this invention is shown in FIG. 1, a floating drum turbine with some longitudinal radial blades that floats on a water stream, and be anchored to the seabed that is rotated by the water stream pushing the turbine blades. The drum length and diameter are the major parameters of the turbine that directly determine the amount of the generated mechanical energy. The turbine floats on the water surface using a buoyant skid mounted below the turbine shaft bearing housings. The buoyant skid consists of two rafter connected hollow capsules, each has a diverter in the front portion to increase the stream velocity acted on the turbine blades, and a guide blade in the bottom portion to keep the skid along the water stream. The skid is anchored to the seabed by some chains/ropes to keep it in a fixed position. The turbine's merge depth into the water is an essential parameter of the system for enhancing the kinetic energy conversation into the electrical energy that is adjusted by placing some shim plates under the bearing housings to merge the turbine blades fully into the water stream.

Figure 2:
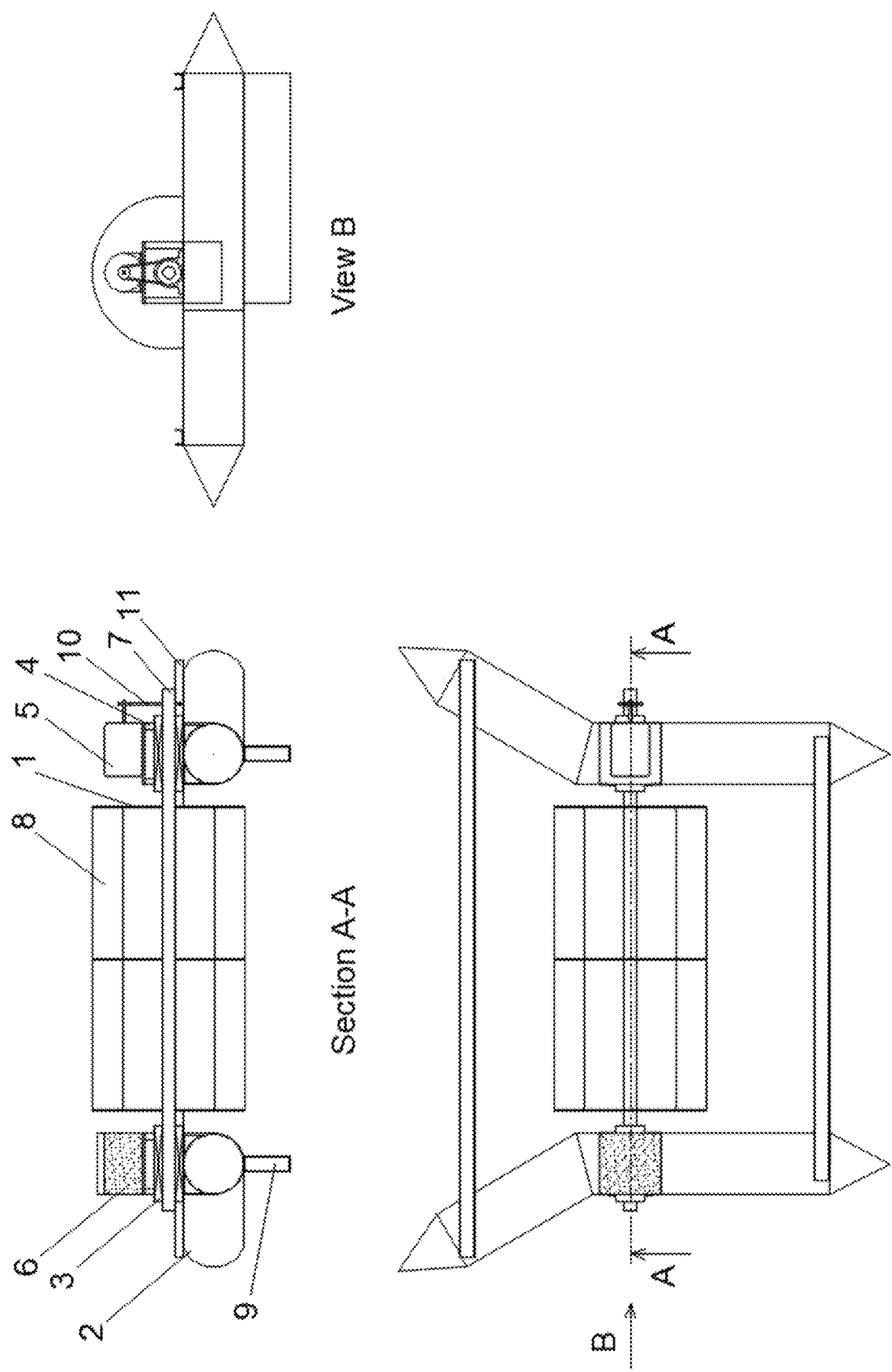
FIG. 2 is a 2D drawing of a floating drum turbine showing its components, including section and side views of the invented turbine.
Figure 3:
FIG. 3 is a 3D drawing of a floating drum turbine.

The major components of this invention are shown in FIG. 2, which includes the turbine side plates 1, a turbine shaft 7, the turbine blades 8, two bearing housings 3, two hollow capsules 2 associated with two guide blades 9, two rafters 11, two base frames 4, an electrical generator 5, a counterweight box 6, and a power transmission system 10 (including a belt and two pulleys installed on the shafts of the turbine and generator).

The drum turbine consists of three major parts 1, 7, and 8. The bearing housings 3 enable the turbine to rotate freely, and transfers the generated torque to the generator shaft through a power transmission system 10 for generating the electricity. The generated electricity is transferred to the coast using a floating cable system. Two base frames 4 are for mounting the generator 5 and the counterweight box 6 that balances the turbine set. The reaction forces, applied to the turbine set by the water stream, are absorbed by anchoring the turbine to the seabed. The hollow capsules 2 are connected to each other by two rafters 11.

To decrease the turbine's moment of inertia that eases rotation, the turbine blades and side plates are made from a low-weight materials like as aluminum alloys or FRP materials that are able to resist against the sea water for the corrosion/erosion protection, and the turbine shaft that is a hollow shaft made from stainless steel pipes to present high strength. The hollow capsules and associated guide blades are made from FRP materials for resisting against the sea water for the corrosion/erosion protection. The base frames, rafters, and counterweight box are made from galvanized steel materials for the corrosion protection.

I claim:

1. A floating drum turbine, which is used for generating electricity from kinetic energy of a water stream that provides mechanical energy needed to rotate an electrical generator, comprising:
   a drum turbine configured to get the mechanical energy of the water stream that converts linear force of the water stream into a rotational torque,
   a buoyant skid floated on the water stream to support the drum turbine;
   two bearing housings mounted on the buoyant skid to support the drum turbine;
   the electrical generator rotated by the drum turbine to generate the electricity;
   a counterweight box configured to balance the buoyant skid;
   two base frames configured, one for mounting the electrical generator on the buoyant skid, and another one for mounting the counterweight box on the buoyant skid;
   a power transmission system configured to transfer generated torque by the drum turbine to the electrical generator;
   chains/ropes configured for anchoring the buoyant skid to seabed.

2. The floating drum turbine of claim 1, wherein the drum turbine comprises longitudinal-radial curved blades surrounded by side plates that are connected to a central shaft; major parameters of the drum turbine are drum length and drum diameter that directly determine amount of the generated torque by the drum turbine.

3. The floating drum turbine of claim 1, wherein the buoyant skid comprises two hollow capsules, each has a diverter in front portion to increase water stream velocity acting on the said drum turbine, and a guide blade in bottom portion to keep the buoyant skid along the water stream; the hollow capsules are connected by two rafters to form the buoyant skid.

4. The floating drum turbine of claim 1, wherein the bearing housings are mounted on the said buoyant skid to support the said drum turbine that is adjusted by placing shim plates under the bearing housings to merge drum turbine blades fully into the water stream; merge depth is an essential parameter of the said drum turbine to enhance kinetic energy conversion into electrical energy.

5. The floating drum turbine of claim 1, wherein the base frames are mounted on the said buoyant skid over the said bearing housings to support the electrical generator and the counterweight box.

6. The floating drum turbine of claim 1, wherein the power transmission system comprises a belt and two pulleys to transfer the generated torque of the said drum turbine to the electrical generator.

7. The floating drum turbine of claim 1, wherein the chains/ropes are used for anchoring the said buoyant skid to the seabed to keep it in a fixed position on the water stream; reaction forces applied to the said drum turbine by the water stream are absorbed by the chains/ropes.

* * * * *